(12) United States Patent
Eidloth et al.

(10) Patent No.: US 10,465,744 B2
(45) Date of Patent: Nov. 5, 2019

(54) ANGULAR CONTACT BALL BEARING HAVING A COLD-FORMED BEARING RING, AND A METHOD FOR MANUFACTURING A BEARING RING OF SAID ANGULAR CONTACT BALL BEARING

(71) Applicant: Schaeffler Technologies AG & Co. KG, Herzogenaurach (DE)

(72) Inventors: Rainer Eidloth, Herzogenaurach (DE); Markus Mantau, Veitsbronn (DE); Reinhard Kick-Rodenbücher, Nürnberg (DE)

(73) Assignee: Scjaeffer Technologies AG & Co. KG, Herzogenaurch (DE)

( * ) Notice: Subject to any disclaimer, the term of this patent is extended or adjusted under 35 U.S.C. 154(b) by 0 days.

(21) Appl. No.: 15/580,452

(22) PCT Filed: Jun. 8, 2016

(86) PCT No.: PCT/DE2016/200266
§ 371 (c)(1),
(2) Date: Dec. 7, 2017

(87) PCT Pub. No.: WO2016/198069
PCT Pub. Date: Dec. 15, 2016

(65) Prior Publication Data
US 2019/0024710 A1    Jan. 24, 2019

(30) Foreign Application Priority Data
Jun. 12, 2015   (DE) .................. 10 2015 210 765

(51) Int. Cl.
*F16C 19/16*    (2006.01)
*F16C 33/64*    (2006.01)
(Continued)

(52) U.S. Cl.
CPC .............. *F16C 19/163* (2013.01); *B21K 1/04* (2013.01); *F16C 33/3806* (2013.01);
(Continued)

(58) Field of Classification Search
CPC ..... F16C 19/163; F16C 33/64; F16C 2220/48
See application file for complete search history.

(56) References Cited

U.S. PATENT DOCUMENTS 2,913,811 A * 11/1959 Benson ................. B21K 1/04
29/898.066
3,142,115 A *  7/1964 Schaming ............. B21K 1/04
29/416
(Continued)

FOREIGN PATENT DOCUMENTS

AT          185664 B      5/1956
CN       101027143 A      8/2007
(Continued)

OTHER PUBLICATIONS

Machine Translation of JP2005-351252.*

*Primary Examiner* — Thomas R Hannon
(74) *Attorney, Agent, or Firm* — Kevin L. Parks

(57) ABSTRACT

Bearing assemblies, such as angular contact bearing assemblies, and methods of producing the same are disclosed. One angular contact ball bearing may include an inner ring and an outer ring, the inner ring having an outer raceway and the outer ring having an inner raceway. A plurality rolling elements may be arranged between the outer raceway and the inner raceway. The outer raceway may be formed by an extrusion of the inner ring and/or the inner raceway may be formed by an extrusion of the outer ring. The raceways may be extruded in their final contour, without any cutting.

13 Claims, 5 Drawing Sheets

(51) Int. Cl.
*F16C 33/38* (2006.01)
*B21K 1/04* (2006.01)
*F16C 43/06* (2006.01)
*F16C 33/46* (2006.01)

(52) U.S. Cl.
CPC .......... *F16C 33/64* (2013.01); *F16C 33/4635* (2013.01); *F16C 43/06* (2013.01); *F16C 2220/48* (2013.01)

(56) References Cited

U.S. PATENT DOCUMENTS

| | | | | |
|---|---|---|---|---|
| 3,477,773 | A * | 11/1969 | Altson | F16C 19/364 384/576 |
| 3,557,587 | A * | 1/1971 | Cardillo | B21J 3/00 72/364 |
| 3,737,965 | A * | 6/1973 | Knapp | F16C 33/64 29/898.066 |
| 4,089,570 | A * | 5/1978 | Markfelder | F16C 19/163 384/510 |
| 4,435,890 | A * | 3/1984 | Ernst | F16C 19/163 29/412 |
| 4,588,314 | A | 5/1986 | Anscher | |
| 4,722,617 | A * | 2/1988 | Stella | F16C 19/163 384/523 |
| 5,273,413 | A * | 12/1993 | Wallin | F01C 21/02 384/516 |
| 7,401,982 | B2 * | 7/2008 | Thompson | F16C 19/52 384/513 |
| 10,012,266 | B1 * | 7/2018 | Moratz | F16C 33/3806 |
| 2010/0172606 | A1 * | 7/2010 | Lunz | B21D 53/10 384/490 |
| 2014/0068947 | A1 * | 3/2014 | Mantau | B21K 1/04 29/898 |
| 2016/0312823 | A1 * | 10/2016 | De Rooster | F16C 19/163 |
| 2017/0173658 | A1 * | 6/2017 | Kobayashi | B21H 1/12 |

FOREIGN PATENT DOCUMENTS

| | | |
|---|---|---|
| CN | 101500823 A | 8/2009 |
| CN | 103370552 A | 10/2013 |
| CN | 204312534 U | 5/2015 |
| DE | 867777 C | 2/1953 |
| DE | 2636903 A1 | 2/1978 |
| DE | 102010022315 A1 | 12/2011 |
| DE | 102012206441 A1 | 1/2013 |
| DE | 102013215871 A1 | 2/2015 |
| GB | 2414697 A | 12/2005 |
| JP | 2005-351252 * | 5/2005 |
| JP | 2014169777 A | 9/2014 |

* cited by examiner

ANGULAR CONTACT BALL BEARING HAVING A COLD-FORMED BEARING RING, AND A METHOD FOR MANUFACTURING A BEARING RING OF SAID ANGULAR CONTACT BALL BEARING

CROSS-REFERENCE TO RELATED APPLICATIONS

This application is the U.S. National Phase of PCT Appln. No. PCT/DE2016/200266 filed Jun. 8, 2016, which claims priority to DE 102015210765.5 filed Jun. 12, 2015, the entire disclosures of which are incorporated by reference herein.

TECHNICAL FIELD

The disclosure relates to an angular contact ball bearing having an inner ring, the inner ring comprising an outer raceway; an outer ring, the outer ring comprising an inner raceway; and a plurality of balls as rolling elements, the balls being arranged between the inner raceway and the outer raceway. The disclosure also relates to a method for manufacturing the inner ring and/or the outer ring of the angular contact ball bearing.

BACKGROUND

Angular contact bearings having balls as rolling elements may be used when the bearings need to deflect a load that is not exclusively radial but rather radial-axial. Angular contact bearings having balls as rolling elements have the advantage that they result in less friction than tapered roller bearings, but on the other hand the load-carrying capacity is lower.

The raceways for the balls have to be oriented relative to the pressure transmission direction. This means that in their axial profile the rings of angular contact bearings have a narrow portion and a wide portion in relation to the radial extent, which merge into one another, the raceway for the balls being arranged in the transition.

The rings of the angular contact bearing are usually formed as solid rings, that is to say they are manufactured as a semi-finished product by separation or removal from a solid material. This method of manufacture leads to low production tolerances but owing to the method of manufacture and to the solid semi-finished product that is needed it is relatively expensive.

As its subject matter the publication DE 10 2012 206 441 A1, which relates to the closest pertinent prior art, discloses a planetary-gear differential, a planet carrier of the planetary-gear differential being supported in relation to a housing by a rolling bearing and the rolling bearing being embodied as an angular contact bearing having balls as rolling elements. It emerges from the description that the bearing outer ring of the rolling bearing is produced by drawing and/or that the bearing inner ring of the rolling bearing is produced by extrusion.

SUMMARY

An object of the disclosure is to propose an angular contact ball bearing which can be cost-effectively produced and at the same time possesses good working characteristics.

This object may be achieved by an angular contact ball bearing having the features disclosed herein and by a disclosed method for manufacturing a bearing ring of the angular contact ball bearing. Preferred or advantageous embodiments of the disclosure are also disclosed in the following description and the figures.

The disclosure relates to an angular contact ball bearing which is embodied, for example, as a radial rolling bearing. The angular contact ball bearing comprises two bearing rings, one of the bearing rings being embodied as an inner ring, the inner ring comprising an outer raceway. The outer raceway is formed by a surface of the inner ring, such as the basic material of the inner ring. Alternatively or in addition to this, the outer raceway is formed integrally with or in the inner ring. The other bearing ring is embodied as an outer ring. The outer ring is arranged coaxially and preferably concentrically with the inner ring. The outer ring comprises an inner raceway, the inner raceway being formed by a surface of the outer ring, such as by the basic material of the outer ring. The inner raceway may be formed integrally with or in the outer ring. The basic material of the inner ring and/or the outer ring is metal, such as steel.

The angular contact ball bearing comprises a plurality of balls as rolling elements. The angular contact ball bearing may be of single-row construction, but may also be of multi-row design. The balls are arranged so that they roll between the inner raceway and the outer raceway and so that under load the balls are in contact both with the inner raceway and the outer raceway.

It is proposed within the scope of the disclosure that the outer raceway be formed by an extrusion of the inner ring and/or the inner raceway by an extrusion of the outer ring. Alternatively or in addition, at least one raceway of a bearing ring of the angular contact ball bearing is cold-formed by extrusion of the bearing ring. In particular, the extrusion process represents the shaping production phase for the raceway, especially for the inner raceway and/or the outer raceway. The extrusion results in a formation of the inner ring and/or the outer ring in their final contour without any cutting.

In the extrusion process the temperature in the workpiece, in this case the bearing ring, in particular the inner ring and/or the outer ring, or a preceding bearing ring blank, is lower than the recrystallization temperature of the basic material of the workpiece. In particular, in the extrusion process the bearing ring blank is delivered to the extrusion operation at ambient or room temperature, such as at a temperature of <50 degrees Celsius. During the forming it is possible, however, for higher temperatures to occur due to the deformation work in the bearing ring blank or in the bearing ring then produced, although even the higher temperatures are lower than the recrystallization temperature of the basic material. The extrusion advantageously generates surface stresses in the bearing ring in the area of the raceway, which lead to an increase in performance. It is furthermore advantageous that the extrusion method of manufacture can be performed very cost-effectively in just such large quantities. Overall, the angular contact ball bearing is thereby cost-effective to manufacture and has good working characteristics.

The angular contact ball bearing may form a contact angle of at least 10 degrees, such as at least 15 degrees, and/or of less than 45 degrees, preferably of less than 40 degrees. The contact angle is measured relative to a plane which is oriented perpendicular to the main axis of the angular contact ball bearing. The contact angle describes the direction in which a load on a bearing ring can be correctly transferred to the other bearing ring.

In one embodiment the bearing rings in longitudinal section are formed along a main axis of rotation of the angular contact ball bearing preferably as follows:

The inner ring comprises an arm portion and a shoulder portion, which are integrally formed with one another, in one piece and/or of the same material. In particular, these are produced, in particular formed, from the same portion of basic material. The inner raceway is arranged at the transition between the arm portion and the shoulder portion. In relation to the radial width the inner ring is wider in the area of the shoulder portion than in the area of the arm portion. For the balls as rolling elements this gives rise, in longitudinal section, to a surface contour which at first runs parallel or tapering to the main axis of rotation in the area of the arm portion, and is then curved away from the main axis of rotation in order to form the outer raceway. This area is formed by or with the shoulder portion.

Alternatively or in addition, the outer ring likewise comprises an arm portion and a shoulder portion, the inner raceway being arranged at the transition between the arm portion and the shoulder portion. In the case of the outer ring the surface contour, in longitudinal section, at first runs parallel, tapering or slightly rising to the main axis of rotation and is then curved towards the main axis of rotation in order to form the inner raceway.

In the bearing ring, therefore, the arm portion is formed narrower in radial extent than the shoulder portion.

As an optional addition, a circumferential channel area is introduced in at least one of the shoulder portions. The channel area is formed into the shoulder portion by the extrusion process. The channel area runs around the main axis of rotation. The channel area is introduced on the shoulder portion on a side remote from the raceway. A circumferential web area is formed on the shoulder area by the channel area. The angular contact ball bearing comprises a cage for guiding the balls, the cage comprising retaining elements which grip around the web area and in particular engage in the channel area, so that a captive fastener for the cage is formed in an axial direction. The cage may be embodied as a plastic cage, or alternatively the cage is produced as a sheet-metal cage. Introducing the channel area and/or forming the web area incorporates a further function into the respective bearing ring, that is to say a captive fastener for the cage. The channel area may be introduced either into the inner ring or into the outer ring.

In one embodiment of the disclosure the retaining elements of the cage are embodied as retaining claws. In particular, the retaining claws are spaced at an interval from one another and/or regularly distributed in a circumferential direction around the main axis of rotation. The retaining elements, in particular the retaining claws, run in an axial direction over the web area and with a free end area dip in a radial direction into the channel area, so that the cage is held captive by positive interlock in an axial direction, away from the shoulder area.

In a possible alternative of the disclosure, instead of a channel area the arm portion is upset in an axial direction, so that an upset area is formed. The upset area forms a thickening of the bearing ring in a radial direction, the thickening and/or the upset area being selected so that a captive fastener for the balls of the angular contact ball bearing is formed in an axial direction. The upset area may be designed with dimensions so that the balls can be clipped into the assembled angular contact ball bearing, but after clipping in are secured by positive interlock. The upset area may be introduced during the cold-forming of the inner ring and/or the outer ring.

The disclosure further relates to a method for manufacturing a bearing ring having a raceway for an angular contact ball bearing as described herein. The bearing ring may be embodied as the inner ring having the outer raceway and/or as the outer ring having the inner raceway. It is therefore possible for the method according to the disclosure and/or the angular contact ball bearing according to the disclosure to comprise one extruded bearing ring or two extruded bearing rings.

In a main shaping step a bearing ring blank is cold-formed by extrusion so as to produce the bearing ring. The main shaping step serves to form the raceway of the bearing ring. The method according to the disclosure allows manufacture to the final contour or final shape (net-shape manufacturing), especially of the raceway, without any cutting.

In a possible development of the disclosure the channel area or the upset area are formed into the bearing ring during the main shaping step. A complex bearing ring shape can thereby be achieved in a single production step without any increase in manufacturing costs.

In one embodiment of the disclosure the bearing ring blank takes the form of a straight hollow cylinder. The bearing ring blank may be produced from an annulus as intermediate product by a preliminary shaping step. In the preliminary shaping step the annulus, in particular the plane or flat annulus, is turned down by the preliminary shaping step and its shape correspondingly modified, so as to produce the bearing ring blank.

In developments of the disclosure the intermediate product, in particular the annulus, for the inner ring and the intermediate product, in particular the annulus, for the outer ring are produced from a circular metal blank. In particular the intermediate product for the inner ring is formed from the center part of the intermediate product for the outer ring, so that only one common circular blank is needed as basic material for both bearing rings. The intermediate products are thereby manufactured cost-effectively as part of a parent-child manufacturing process and/or as coaxial and concentric circular rings.

BRIEF DESCRIPTION OF THE DRAWINGS

Further features, advantages and effects of the disclosure emerge from the following description of embodiments of the disclosure and from the figures attached, of which.

Parts or areas corresponding or identical to one another are provided with corresponding or identical reference numerals in the figures.

DETAILED DESCRIPTION

Figure 1A:
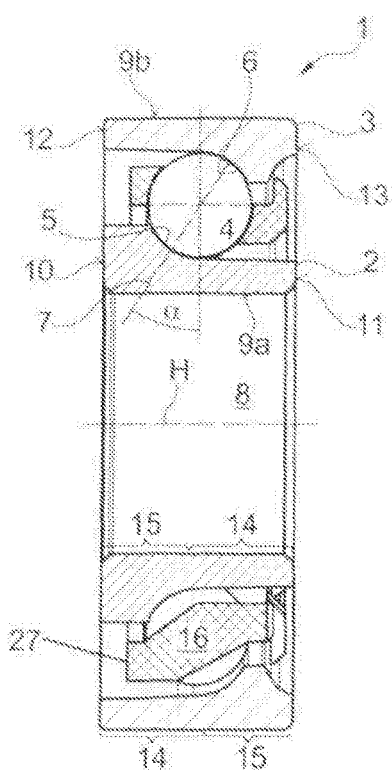
FIGS. 1a, 1b each show sectional representations of an angular contact ball bearing as exemplary embodiments of the disclosure.
Figure 1B:
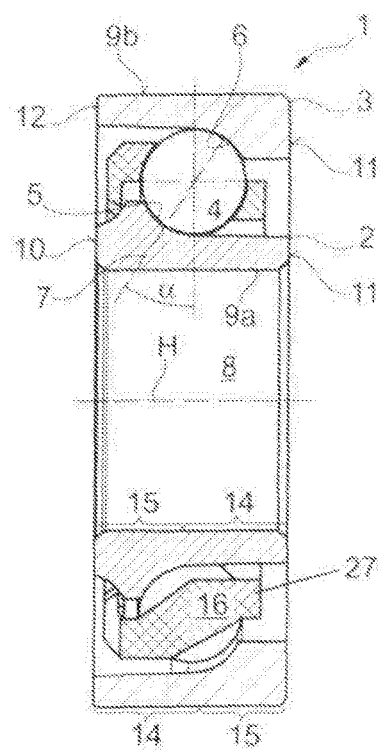

FIGS. 1a, 1b each show a schematic longitudinal section through an angular contact ball bearing 1 as an exemplary embodiment of the disclosure. The angular contact ball bearing 1 comprises an inner ring 2 and an outer ring 3, which are arranged coaxially and concentrically with one another and with a main axis of rotation H. A row of balls 4 as rolling elements is arranged in a cage 27 between the inner ring 2 and the outer ring 3.

The balls 4 run on the inner ring 2 on an outer raceway 5 and on the outer ring 3 on an inner raceway 6. The outer raceway 5 is formed by a basic material of the inner ring 2 and/or produced integrally with the inner ring 2. The inner raceway 6 of the outer ring 3 is formed by a basic material of the outer ring 3 and/or integrally formed with the outer ring 3. The outer raceway 5 and the inner raceway 6 are arranged so as to produce a contact angle α for the pressure lines 7, via which loads are transferred from the one bearing ring to the other bearing ring. The contact angle α is defined in relation to a plane which is arranged perpendicular to the main axis of rotation H and in this example is approximately 30 degrees.

The inner ring 2 has an aperture 8 though which a shaft or spindle can be inserted. The aperture 8 is defined in a radial direction to the main axis of rotation H by a cylindrical surface 9a of the inner ring 2. On its radially outer side the outer ring 3 has a cylindrical surface 9b, which forms a contact face for supporting the outer ring 3 in a support structure. In an axial direction the inner ring 2 is defined by a first end face 10 and a second end face 11 and the outer ring 3 is defined by a first outer end face 12 and a second outer end face 13.

In the longitudinal section shown the inner ring 2 and the outer ring 3 as bearing rings each comprise an arm portion 14 and a shoulder portion 15. The thickness of the bearing rings at the arm portion 14 in a radial direction to the main axis of rotation H is smaller than the thickness in the shoulder area 15. The raceway of the bearing ring, which is to say the outer raceway 5 or the inner raceway 6, is arranged in the transition from the arm portion 14 to the shoulder portion 15. In the arm portion 14 the contour of the bearing rings facing the rolling element compartment 16 is parallel or tapering to the main axis of rotation H, or rising into the rolling element compartment 16 from the free edge, and then merges into the raceway, in particular the outer raceway 5 or the inner raceway 6. The inner ring 2 and the outer ring 3 are each formed in one piece.

Figure 2:
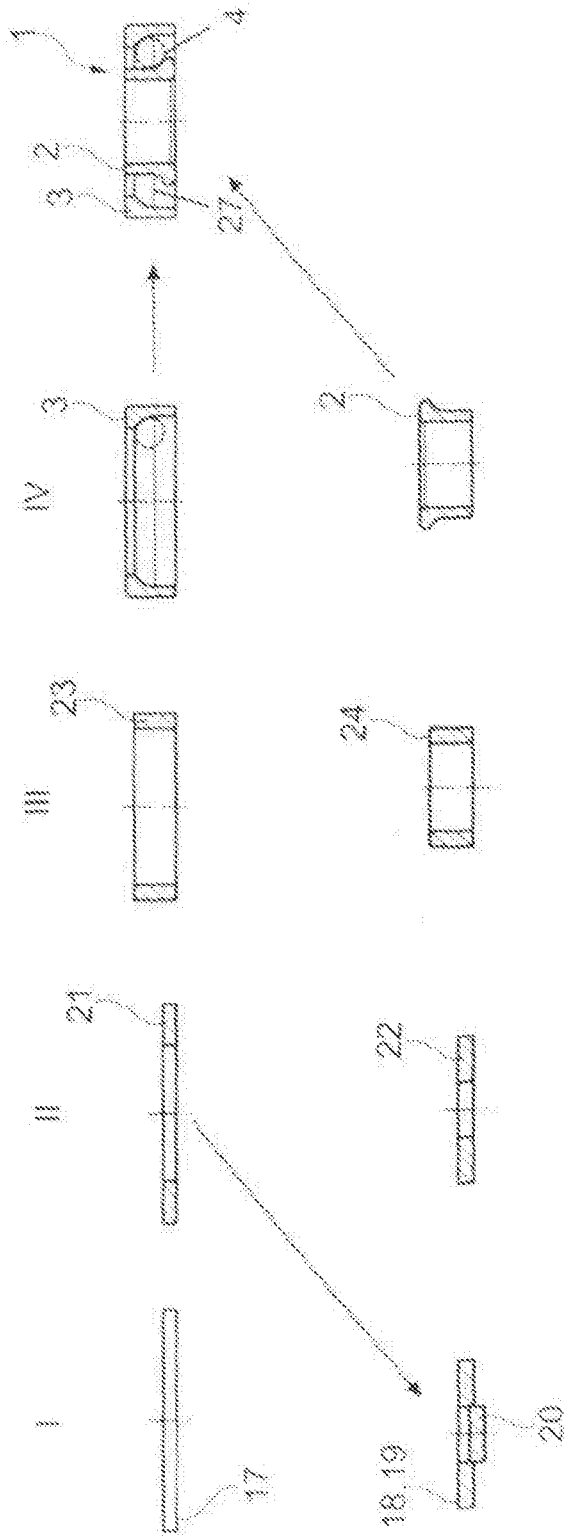
FIG. 2 shows an illustration of the manufacturing of the bearing rings for the angular contact ball bearings in the preceding figures.

In FIG. 2 an illustration relating to the description of a method for manufacturing the bearing rings, in particular the inner ring 2 and the outer ring 3, is represented in cross section:

In a step I a center part 18 is removed from a circular metal blank 17. The center part 18 forms a further, smaller circular metal blank 19. A center part 20 is removed from the smaller circular metal blank 19.

Step II shows a flat annulus 21 and 22 both for the inner ring 2 and for the outer ring 3 respectively.

In a step III the annulus 21, 22 is shaped into a bearing ring blank 23, 24. The annulus 21, 22 forms an intermediate product in the manufacture of the inner ring 2 and the outer ring 3 respectively. The bearing ring blank 23, 24 forms the basis for the inner ring 2 and the outer ring 3 respectively. Step III is also referred to as a preliminary shaping step.

In a step IV, which may also be referred to as the main shaping step, the bearing ring blank 23, 24 is extruded. In this process the shaping is carried out at a temperature which lies below the recrystallization temperature of the bearing ring blank 23, 24 or the inner ring 2 and the outer ring 3. In the main shaping step material is displaced in such a way that the shoulder portion 15 is formed wider than the arm portion 14 (cf. FIGS. 1a and 1b).

In a step V the inner ring 2 and the outer ring 3 are assembled together with the cage 27 and the balls 4 to form the angular contact ball bearing 1.

Figure 3:
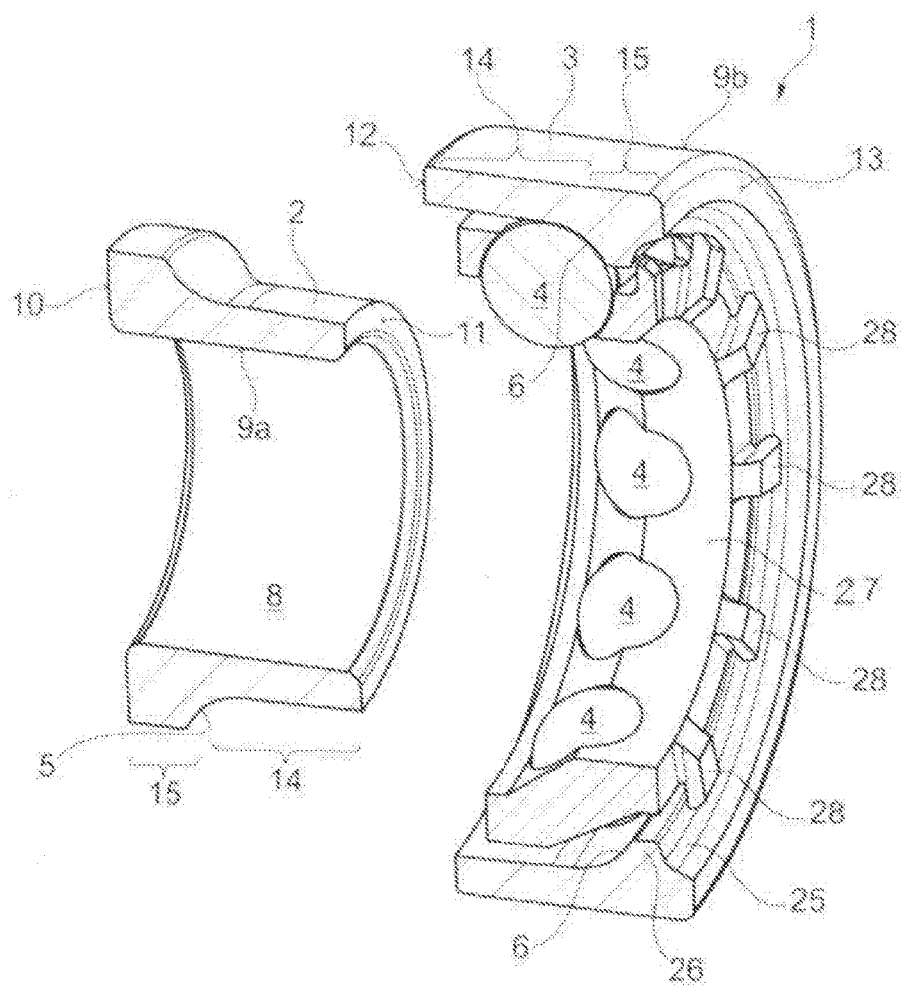
FIG. 3 shows a partially sectional, three-dimensional exploded representation of an angular contact ball bearing as a further exemplary embodiment of the disclosure.

FIG. 3 shows a partially sectional, three-dimensional representation of the angular contact ball bearing 1. As already described, the inner ring 2 comprises the arm portion 14 and the shoulder portion 15. In the case of the outer ring 3 it can be seen that the shoulder portion 15 has a channel area 25, which is introduced on the radially inner side and is arranged running around the main axis of rotation H (cf. FIG. 1a). The channel area 25, displaced radially outwards, forms a web area 26, located on one side of which is the inner raceway 6 and on the other side of which is the channel area 25.

The angular contact ball bearing 1 comprises a cage 27, in which the balls 4 are guided, separated by a distance from one another. On its axially outer side the cage 27 comprises a plurality of retaining claws 28, which constitute retaining elements of the cage 27. The retaining claws 28 are formed on the cage 27 in such a way that these overlap the web area 26 in an axial direction, and in a radial direction are designed with a length such that they engage behind the web area 26. In this way the cage 27 and hence the balls 4 cannot fall out in an axial direction to the main axis of rotation H, even when the inner ring 2 is removed. In a first axial direction the cage 27 with the balls 4 is retained through positive interlock by the inner raceway 6 to prevent them falling out. In the opposite direction the retaining claws 28 are located behind the web area 26 so that they prevent any axial displacement of the cage 27 with the balls 4 through positive interlock. This type of positively interlocking captive fastener by means of the retaining elements is also represented in FIG. 1a.

Figure 4:
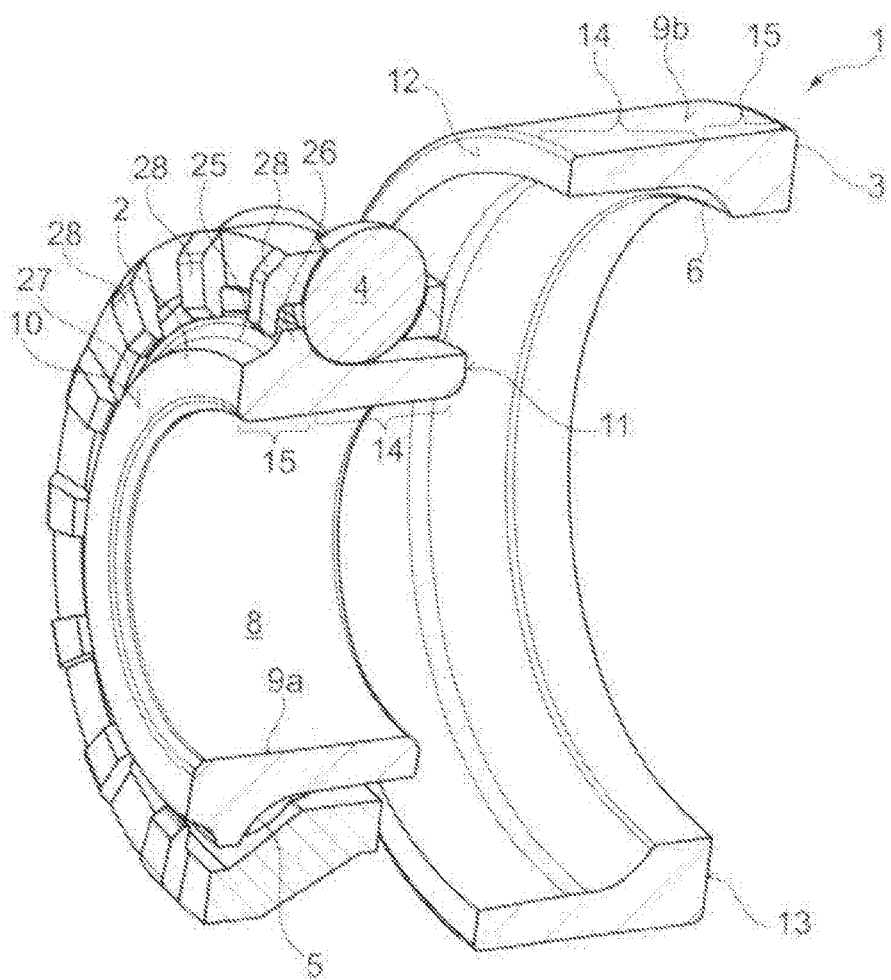
FIG. 4 in a similar representation to FIG. 3 shows a further exemplary embodiment of an angular contact ball bearing.

FIG. 4 shows an alternative embodiment which also corresponds to the embodiment in FIG. 1b. In the embodiment in FIG. 4 the channel area 25 and consequently the web area 26 is arranged on the shoulder portion 15 of the inner ring 2. The retaining claws 28 as retaining elements of the cage 27 grip radially inwards around the web area 26, so that the cage 27 is secured through positive interlock in one axial direction by the inner raceway 5 and in the other axial direction by the retaining claws 27, arranged so that they grip over and behind the web area 26. The channel area 25 may be introduced into the inner ring 2 or the outer ring 3 during the main shaping step/step IV.

Figure 5A:
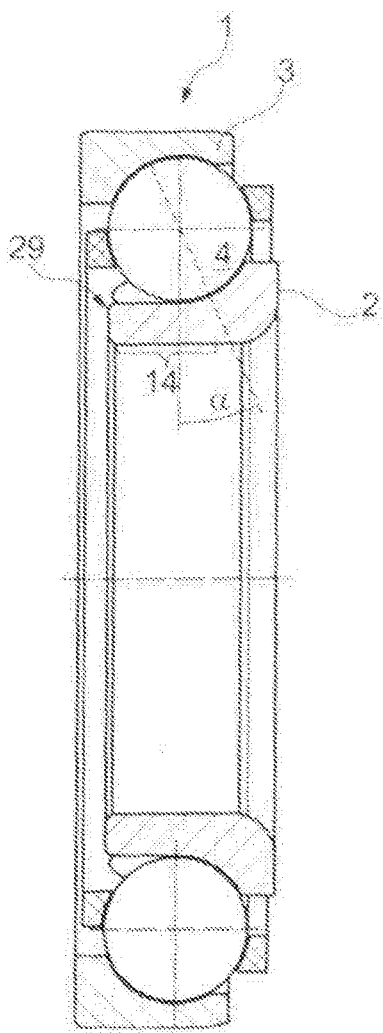
FIGS. 5a, 5b each show an angular contact ball bearing represented in the same way as in FIGS. 1a, 1b as further exemplary embodiments of the disclosure.
Figure 5B:
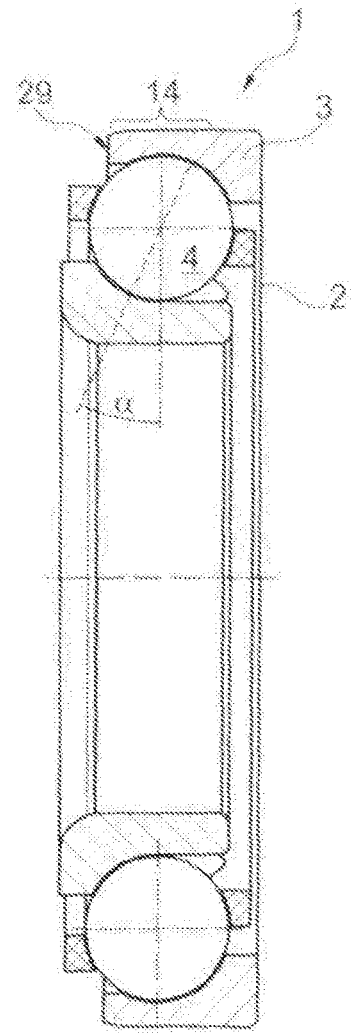

FIGS. 5a, 5b show a further exemplary embodiment of the disclosure in which, compared to the exemplary embodiment in FIGS. 1a, 1b, the arm portion 14 is upset in an axial direction, so that in the exemplary embodiment 5a an upset area 29 is produced on the inner ring 2 which holds the balls 4 in the inner ring 2 through positive interlock. In FIG. 5b on the other hand the outer ring 3 is upset in an axial direction so that the upset area 29 is produced in the arm portion 14 of the outer ring 3 and the balls 4 are secured through positive interlock in an axial direction. This represents an alternative embodiment of the captive fastener.

The upset area 29 is introduced into the inner ring 2 or the outer ring 3 during the main shaping step and/or step IV.

LIST OF REFERENCE NUMERALS 1 angular contact ball bearing
2 inner ring
3 outer ring
4 balls 5 outer raceway
6 inner raceway
7 pressure line
8 aperture
9a,b cylindrical surface
10 first end face
11 second end face
12 first outer end face
13 second outer end face
14 arm portion
15 shoulder portion
16 rolling element compartment
17 circular metal blank
18 center part
19 circular metal blank
20 center part
21 annulus
22 annulus
23 bearing blank
24 bearing blank
25 channel area
26 web area
27 cage
28 retaining claws
29 upset area
α contact angle
H main axis of rotation

The invention claimed is:

1. An angular contact ball bearing, comprising:
an inner ring, the inner ring having an outer raceway;
an outer ring, the outer ring having an inner raceway;
a plurality of balls as rolling elements, the balls being arranged between the outer raceway and the inner raceway; and
a cage for guiding the balls and including a plurality of retaining elements, wherein:
  a final contour of the outer raceway is formed by an extrusion of the inner ring or a final contour of the inner raceway is formed by an extrusion of the outer ring, without any cutting;
  the inner ring includes an arm portion and a shoulder portion in a longitudinal section along a main axis of rotation (H), and the outer raceway is arranged at a transition between the arm portion and the shoulder portion, or the outer ring includes an arm portion and a shoulder portion, and the inner raceway is arranged at the transition between the arm portion and the shoulder portion;
  the shoulder portion includes a circumferential channel area on a side of the shoulder portion opposite the outer raceway or the inner raceway to form a circumferential web area between the outer raceway or the inner raceway and the circumferential channel area; and,
  the plurality of retaining elements run in an axial direction over the circumferential web area with a free end area dip in a radial direction to grip around the circumferential web area and form a captive fastener for the cage in an axial direction.

2. The angular contact ball bearing as claimed in claim 1, wherein the angular contact ball bearing forms a contact angle (alpha) of at least 10 degrees and less than 45 degrees.

3. The angular contact ball bearing as claimed in claim 1, wherein the plurality of retaining elements of the cage are embodied as retaining claws.

4. The angular contact ball bearing as claimed in claim 1, wherein the arm portion is upset in an axial direction, an upset area being formed, the upset area forming a captive fastener for the plurality of balls in an axial area.

5. The angular contact ball bearing as claimed in claim 1, wherein the angular contact ball bearing is of multi-row design.

6. The angular contact ball bearing as claimed in claim 1, wherein the cage is a sheet metal cage.

7. The angular contact ball bearing as claimed in claim 1, wherein the cage is a plastic cage.

8. An angular contact ball bearing, comprising:
an inner ring including an outer raceway having an extruded contour;
an outer ring including an inner raceway having an extruded contour;
a plurality of balls as rolling elements, the balls being arranged between the extruded contour of the outer raceway and the extruded contour of the inner raceway; and,
a cage for guiding the balls, wherein:
  the inner ring includes an arm portion and a shoulder portion in a longitudinal section along a main axis of rotation (H) and the outer raceway is arranged at a transition between the arm portion and the shoulder portion, or the outer ring includes an arm portion and a shoulder portion in a longitudinal section along a main axis of rotation (H) and the inner raceway is arranged at the transition between the arm portion and the shoulder portion;
  the shoulder portion includes an extruded circumferential channel area on a side opposite the inner raceway or the outer raceway to form a circumferential web area between the outer raceway or the inner raceway, and the extruded circumferential channel area; and,
  the cage includes retaining elements extending in an axial direction over the circumferential web area with a free area radial dip into the extruded circumferential channel area to grip around the circumferential web area and form a captive fastener for the cage in an axial direction.

9. The angular contact ball bearing as claimed in claim 8, wherein the angular contact ball bearing forms a contact angle (alpha) of at least 10 degrees and less than 45 degrees.

10. The angular contact ball bearing as claimed in claim 8, wherein the plurality of retaining elements of the cage are embodied as retaining claws.

11. The angular contact ball bearing as claimed in claim 8, wherein the arm portion is upset in an axial direction, an upset area being formed, the upset area forming a captive fastener for the plurality of balls in an axial area.

12. The angular contact ball bearing as claimed in claim 8, wherein the cage is a sheet metal cage.

13. The angular contact ball bearing as claimed in claim 8, wherein the cage is a plastic cage.

* * * * *